Feb. 2, 1971 R. HAGEN 3,559,235
DEVICE FOR MAKING HOLLOW BODIES FROM PREFORMED THERMOPLASTIC
MATERIAL ACCORDING TO A BLOW MOLDING PROCESS
Filed Dec. 20, 1967 2 Sheets-Sheet 1

INVENTOR
Reinold Hagen
BY
Edwin E. Greigg

United States Patent Office 3,559,235
Patented Feb. 2, 1971

3,559,235
DEVICE FOR MAKING HOLLOW BODIES FROM PREFORMED THERMOPLASTIC MATERIAL ACCORDING TO A BLOW MOLDING PROCESS
Reinold Hagen, Hangelar uber Siegburg, Rhineland, Germany
Filed Dec. 20, 1967, Ser. No. 692,194
Claims priority, application Germany, Dec. 23, 1966, K 60,999
Int. Cl. B29f 3/014
U.S. Cl. 18—5
8 Claims

ABSTRACT OF THE DISCLOSURE

The disclosure relates to improvements in a method and apparatus for blow molding preformed articles which are positioned between reciprocal mold elements, the carriers of which are arranged for reciprocal movement between spaced beam members.

BACKGROUND OF THE INVENTION

The present invention relates to a device for making preformed hollow bodies from thermoplastic material according to a blow molding process which device comprises a blow mold being either bipartite or multisectional whose parts are movable relative to each other, a supply line for feeding the pressure medium into the mold and into the premolded blank disposed therein, and means for supporting and driving the parts or sections of the mold, and further means for absorbing the forces resulting from the blowing pressure.

OBJECTS AND SUMMARY OF THE INVENTION

One of the objects of the present invention is to provide a device of this type which is arranged in such a manner that it can be adapted to absorb the forces resulting from the blowing pressure without requiring therefor complicated and expensive measures. When the blank within the mold is expanded, the thus arising forces have the tendency of forcing the mold apart, i.e. the two halves of the mold, in other words, they attempt to open the mold. This is to be avoided at all cost.

These forces which counteract the closing movement of the mold, are increasing progressively in proportion with the greater dimensions of the hollow body to be made and the progressively increasing dimensions of the mold itself. It is thus evident that when employing the known construction, machines with progressively larger hollow bodies become progresisvely heavier and more expensive. Accordingly, it is an object of the present invention to provide a device of the type described hereinabove in a manner which is as simple as possible so that when also larger hollow bodies are to be made, the forces resulting from the blowing pressure will cause no difficulties at all, neither with regard to structure nor with regard to manufacturing techniques.

To attain this object, the present invention proposes that the mold parts or sections be arranged in a closed frame and adapted to be positioned on a suitable base. A frame of this type is considerably more suitable for absorbing the forces resulting from the blowing pressure than the heretofore generally used U-shaped constructions. It is essential in this regard that the apparatus be nevertheless simple and readily recognizable with respect to its structure and its manipulation.

The mold parts are suitably arranged on specific base elements in a known manner. According to a further embodiment of the present invention, the mold parts may be arranged in a suspended manner and may run or travel on the upper cross bar member of the frame with the interposition of wheels, rollers or the like. The suspended arrangement of the mold parts has the advantage that the area therebelow is easily accessible. This facilitates the assembly and disassembly of the mold, particularly in view of the fact that the latter can have considerable weight if it is intended for the manufacture of larger hollow bodies. Of course, it is also possible to cause the wheels, rollers or the like, which—taken as a whole—constitute the traveling gear or mechanism of the respective mold part, to run on the lower cross bar member of the frame.

The drive of the mold parts is advantageously effected in a known manner by means of a hydraulic piston cylinder arrangement each of which is preferably disposed at the supporting members or spars of the frame which connect the upper and the lower bar members with each other.

The forces resulting from the blowing pressure can be transmitted to the frame by way of the hydraulic piston cylinder arrangements for the drive of the mold parts. This is the case, for example, if the cylinders of these arrangements are sustained by the supporting spars of the frame. It is a prerequisite therefor that the entire hydraulic system be so designed that it can absorb and transmit such forces which may amount to more than 100 tons. On the other hand, there also exists the possibility of locking, in the closing position of the mold, these elements of the piston cylinder arrangements or groups which are either directly or indirectly connected with the mold parts or sections, preferably the pistons and, respectively, the piston rods thereof. In that case, the means which bring about the locking action transmit the forces resulting from the blowing pressure to the frame so that pressure is relieved from the hydraulic equipment. The provision may be made in such a manner that the movable parts of the piston cylinder arrangements, preferably the piston rod, are adapted to be supported with regard to the frame in the closing position of the mold with the interposition of an elbow lever system. Means for securing the elbow lever in the extended position thereof are suitably provided for. These means may comprise, for example, in that each elbow lever system is provided with a hydraulic or pneumatic piston cylinder arrangement which secures the elbow lever system in its extended position. The piston rod of this piston cylinder group may be in operative engagement with the pivot point of the elbow lever system, whereas a stationary abutment is expediently disposed on the other side of the elbow lever system.

Furthermore, the provision proposed by the present invention allows also for the possibility of locking the mold parts or sections with respect to each other in the closed position of the mold so that as a result the forces resulting from the blowing pressure will be absorbed directly by the mold itself. This locking mechanism may be so constructed that the two mold halves or bases carrying the same, are equipped with spindles which, in the closing position of the mold, engage in spindle nuts disposed at the oppositely positioned mold part or section.

The mold halves or bases may comprise extended portions or projections which are disposed on both sides of the cross bar member, the latter comprising preferably two parallel rails or beams which are provided with rollers or the like running on the rails. It is expedient to also provide for rollers which rest against the other side of the cross bar member, i.e. for example, against the underside of the upper cross bar member. As a result thereof, that is to say, by virtue of the arrangement of the rollers or wheels on both sides of the cross bar member and, respectively, of the two rails, a specific forcible guide of the respective base and of the mold part, respectively, is assured so that there is no danger of tilting of the base or of the mold part with respect to the cross bar member supporting the same, whether it be disposed at the upper side or at the lower side.

The rollers, wheels or the like are suitably arranged on an axle which includes an offset portion. The eccentrics which are formed in this manner serve for rendering the rollers, wheels, or the like adjustable with the ultimate aim of adapting and matching the rollers or the like precisely with respect to the guide rails, and accordingly the two foundations or bases with regard to the mold halves. The latter feature is important particularly with respect to accuracy with which the mold can be closed.

In order to assure that the movements of the mold parts be as uniform as possible during the closing and opening movements thereof, it may moreover be advantageous to include in the mechanism a rotary chain or the like which is mounted on one of the cross bar members and to connect bases and, respectively, projections in each case with one flight of the chain. Both bases and, respectively, mold parts are thus forcibly synchronized with respect to the velocity and course of the movement. For purposes of lateral guiding of the bases and mold parts, additional rollers, wheels or the like may be provided for which engage laterally at each of the respective cross bar members.

The present invention further provides that the piston rods of the hydraulic drive for the mold parts or sections are in operative engagement with the respectively coordinated base element by way of one ball and socket joint each. It has been found that particularly advantageous for this purpose is a construction in which the base or foundation body or element is equipped with a sliding member carrying at its side facing the piston rod, a ball cup or socket in which engages the correspondingly shaped free end of the piston rod. In this case, the sliding member is displaceable within the base body approximately at ringt angle to the direction of movement of the piston rod. This provision assures that the sliding member is adapted to adjust itself freely in all directions and at all angles, both with regard to the foundation or base element and with regard to the piston rod. Any jamming and squeezing as it might possibly occur under different circumstances particularly with the mold being closed, is thus prevented with certainty.

The cross bar member carrying the mold halves, the foundations or bases, etc., expediently comprises reinforcements which may be obtained, for example, by means of web plates which are either welded or welded on. In this manner it is possible to reduce the deflection of the supporting cross bar member to a minimum so that the accuracy with which the mold parts must be arranged with respect to each other, particularly in the case of the mold being closed, is not impaired by the deflection of the cross bar member.

The connection or operative engagement between the cross bar members and the supporting members is suitably effected by means of shearing plates.

BRIEF DESCRIPTION OF THE DRAWINGS

Several embodiments of the present invention are illustrated in the accompanying drawings, wherein.

DESCRIPTION OF THE PREFERRED EMBODIMENT

Figure 1:
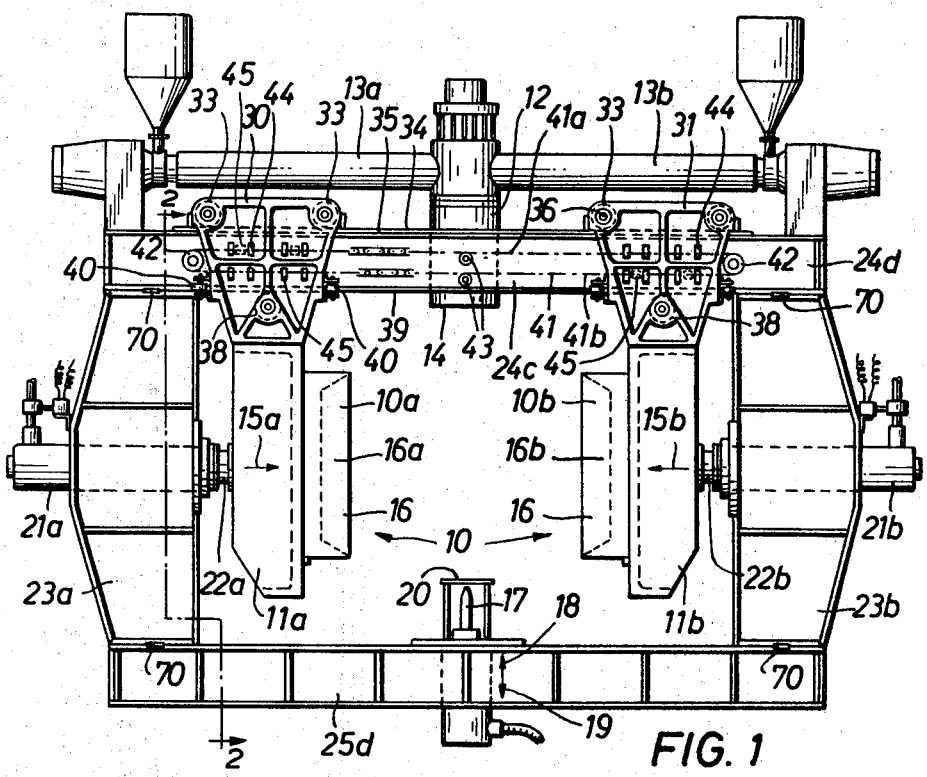
FIG. 1 is a side elevational view of the device proposed by the present invention for making hollow bodies from thermoplastic material according to the blowing process.
Figure 2:
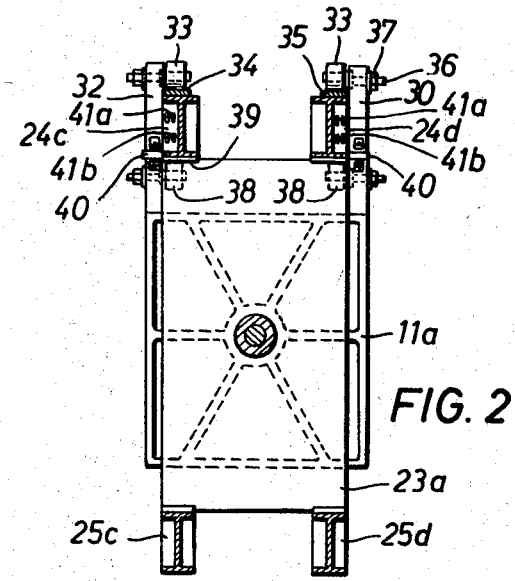
FIG. 2 is an end view of one portion of the machine on line 2—2 of FIG. 1.
Figure 3:
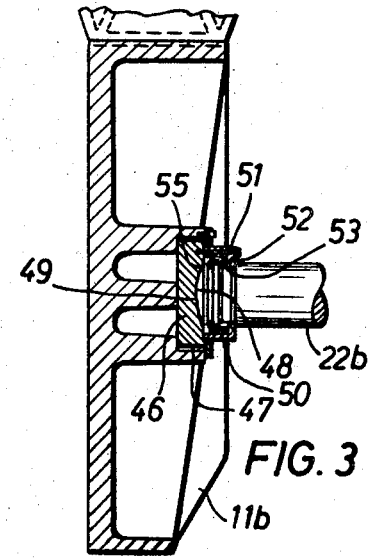
FIG. 3 is an enlarged cross-sectional view through a foundation or base with the piston rod cooperating therewith.

The embodiment of the present invention shown in FIGS. 1–3 proposes the use of a bipartite hollow mold 10 which consists of two mold halves 10a and 10b. The two mold halves 10a and 10b are detachably mounted each on a foundation or base 11a and 11b, respectively. In the relative position of the mold parts as shown in FIG. 1 it will be observed that the hollow mold 10 is open preparatory to use.

The manufacture of a hollow body is carried out in such a manner that first a premolded blank in the form of a tube section or in the form of either one or more foils is introduced into the area between the two mold halves 10a and 10b of the open hollow mold 10. For this purpose, an injector head 12 into which the thermoplastic material is introduced by means of two extruders 13a, 13b is disposed intermediate and above the parts comprising the hollow mold 10. This injector head 12 comprises at the underside 14 thereof an annular nozzle for the purpose of pressing a tube section thereagainst. The injector head 12 may have the characteristics which have been described in applicant's patent 3,345,690.

After the premolded blank (not shown) has reached the necessary length for making a hollow body in the mold 10, the latter is closed, and this is accomplished by moving the two halves 10a, 10b toward each other in the direction of the arrows 15a, 15b. Each mold half includes a recess 16a and 16b, respectively. The latter form jointly—in the closed position of the mold 10—the mold nest 16 whose configuration corresponds to the outer contour of the hollow body to be made. Once the mold has been closed, or even prior thereto, a pressure medium, preferably compressed air, is introduced into the blank so that it is expanded until it comes to rest against, or makes contact with the confronting walls of the mold nest 16. For this purpose a blowing or injector nozzle 17 shown in the embodiment of FIG. 1 of the drawings is arranged to project from below into the mold and into the premolded blank disposed therein. The blowing nozzle 17 may, of course, also be accommodated elsewhere, for example, in such a manner that it will project into the blow mold from above. The blowing or injector nozzle 17 is movable upwardly and downwardly in the direction of the arrows 18 and 19. The lower position thereof is shown in FIG. 1 of the drawings. Coordinated with the blowing nozzle 17 is a stripper or scraper 20 which, after the completion of the hollow body and after opening of the mold, may serve for separating the hollow body from the blowing nozzle 17. The blowing nozzle 17 which projects into an opening of the hollow body serves generally at the same time as a calibrating or sizing mandrel for this opening. Accordingly, when the two mold halves 10a, 10b have been moved apart with respect to each other, the hollow body is supported on the blowing nozzle 17. If the latter is displaced downwardly, i.e., in the direction of the arrow 19, the hollow body can follow this movement only until it strikes against the stripper 20. Thereafter, the continued movement of the blowing nozzle 17 in a downward direction has the effect that it is retracted from the hollow body. Instead of the blowing nozzle 17, the use of a needle or other suitable means for supplying the blowing air or the like is also considered to be possible, of course.

The reciprocal motion of the two bases 11a and 11b with the mold halves 10a, 10b for the purpose of closing and opening the mold 10 is accomplished by means of hydraulic cylinders 21a, 21b. The piston rods 22a, 22b of the pistons—which latter are guided in the cylinders 21a, 21b—are connected with respective portions of each of the bases 11a, 11b as shown. The cylinders 21a, 21b are supported by the vertical spars 23a, 23b of a rectangular frame which is complemented by two cross-bar members 24 and 25. Each of the two cross-bar members comprises two pairs of rails 24c, 24d and 25c, 25d. The vertical spars 23a, 23b comprise one piece elements each of which is positioned between the upper and lower pairs of rails.

Each of the bases 11a, 11b includes on the upper side thereof two plate-like projections, three of which are visible in FIGS. 1 and 2. They have been identified with reference numbers 30, 31 and 32. Rollers 33 are disposed in pairs on the projections. These rollers 33 run or travel on the upper delimiting surfaces 34 of specific reinforcing supports or bases 35 of the rails 24c, 24d.

The rollers 33 are secured in position in each case by means of a bolt 36 which is held by a nut 37. The bolts 36 are offset, that is to say, they are provided as eccentrics; in other words, as compared to the area of the respective bolt 36 being provided with the coordinated nut 37, the area holding or supporting the rollers 33 is slightly offset transversely to the longitudinal axis of the bolt. The eccentric being formed in this manner has the advantage that it is possible by turning the bolt 36 to change the position of the roller 33 relative to the respectively assigned rail and to thus adapt it thereto.

The plate-like extensions or projections are also equipped with rollers 38 which are in rolling contact with the underside 39 of the rails 24c, 24d. Also provided are lateral rollers 40 which travel longitudinally of the rails 24c, 24d. This assures a perfect guide for the bases 11a, 11b which are suspended on the upper supporting members 24c and 24d during the closing and opening movements thereof. A synchronization of the opening and closing movement of the mold parts is additionally effected by means of two chains 41a—41a which are disposed adjacent to the rails or supporting members 24c, 24d. These chains rotate about longitudinally spaced rollers 42 and are supported intermediate their length by guide rollers 43. The extensions or projections 30 of the base 11a are in operative engagement with the upper flights 41a and the projections 31 of the base 11b are connected with the lower flights 41b of the two chains 41a and 41b. For a respectively opposite direction of travel of the two bases 11a and 11b the chains 41a and 41b thus bring about an absolute synchronism of these two bases, and therewith of the respectively coordinated mold halves 10a, 10b with regard to the extent and speed of this movement. The tighteners 45—45 are rigidly secured to the respective plate-like projections and serve for adjusting and tightening the chain flights relative to the respective base 11a and/or 11b.

In the afore-described arrangement of the elements with respect to each other, the forces resulting from the blowing pressure are absorbed in their entirety by the frame which comprises two vertical spars or support members 23a, 23b, a pair of longitudinally extending upper supporting members 24c and 24d as well as a pair of elements 25c and 25d positioned at the bottom thereof. The closed frame construction allows for controlling even very large forces, which may arise particularly during the manufacture of large containers, without significant structural difficulties.

Even though it is possible to reduce the deflection of the upper support members 24c and 24d and on which the two bases 11a, 11b are suspended, to an amount which is smaller than 0.5 mm., it is expedient to guard against any such occurrences and to additionally provide for means which prevent jamming between the elements in any case and under any circumstances. FIG. 3, which illustrates the right base 11b and the respectively coordinated piston rod 22b, shows an especially advantageous possibility of the connection between the base bodies and their respective piston rod. In each of the two bases, a sliding member 46 is arranged within a recess 47 of the base. This recess is slightly greater than the expansion of the sliding member 46 transversely to the direction of movement of the piston rod 22b, so that the sliding member 46 is adapted to adjust completely freely in all directions. At the side thereof facing the piston rod 22b, the sliding member 46 comprises a ball cup or socket 48 which engages in the correspondingly formed end face 49 of the piston rod which is seated therein. The anchoring or connection between the piston rod and the sliding member 46 is effected by way of a ring 50 which is in operative engagement with the sliding member 46 by means of bolts 51 and comprises at the end thereof facing away from the sliding member 46 a flange-like projection or extension 52, the latter engaging behind a projection 53 of the piston rod. The projection 53 may be provided as a separate ring. The afore-described construction of the connection between the piston rod and the corresponding base renders it possible that both elements, i.e., the piston rod and the base, can freely adjust themselves relative to each other. Jamming and the like is thereby avoided.

Figure 4:
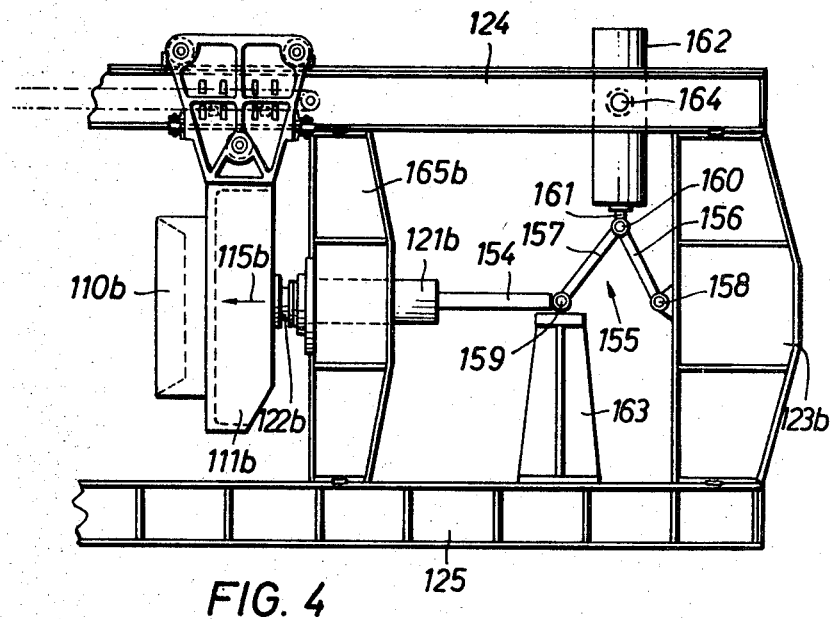
FIG. 4 illustrates a side elevational view of a second embodiment according to the present invention.

The embodiment according to FIG. 4 corresponds essentially to that shown in FIGS. 1 to 3. For this reason, like reference numerals, which are higher than 100, however, have been used for defining the same elements. FIG. 4 illustrates, in a view corresponding to FIG. 1, the right side of a device for making hollow bodies from thermoplastic material. Here again, a frame is provided which comprises one of a pair of supporting members 124 and 125 as well as vertical spars of which only the right spar 123b is visible in the drawing. The bases are equally suspended on the upper supporting member, and specifically in the form and manner described hereinabove in connection with FIGS. 1–3. Furthermore, the drive of the bases—the right one of which 111b and its corresponding mold half 110b being shown—is effected by way of a hydraulic cylinder 121b. The piston rod 122b of the piston of this embodiment is guided within the cylinder 121b but is rearwardly elongated or extended. The end 154 of the piston rod which projects out of the cylinder 121b at the side facing away from the base 111b is provided with a series of interconnected levers generally indicated at 155. One arm 156 is supported at the vertical spar 123b at pivot 158 and the other arm 157 of the lever system is connected to the rear end 154 of the piston rod at pivot 159. The levers 156 and 157 are associated by a fulcrum 160 now to be described.

DESCRIPTION OF THE SECOND EMBODIMENT

In FIG. 4 the blow mold is illustrated in the open position thereof. In this case, the two levers 156, 157 are pivoted upwardly so that the two joints or fulcrums 158 and 159 have approximately the shortest distance with respect to one another. The piston rod 161 of a piston which is guided within a cylinder 162 acts upon the joint or fulcrum 160 connecting the two arms or levers 156 and 157 with each other. This cylinder 162 is supported or held by the upper supporting member 124.

The closing movement of the mold, in the course of which the mold half 110b and the base 111b are displaced in the direction of the arrow 115b, results at the same time in an extension of the system of levers in the course of which the piston rod 161 moves downwardly, and the distance between the two joints or fulcrums 158, 159 increases until the two arms 156, 157 assume an extended position in which they thus are in alignment with the piston rod 122b. In its fully extended position of the lever system, the fulcrum 160 now rests on a stationary support 163. The piston which is guided within the cylinder 162 is acted upon at the upper side with a pressure medium so that the lever system 155 cannot yield either upwardly or downwardly. It should be noted in this connection that the cylinder 162 is pivotable about the axle 164 which thereby causes it to follow the lateral displacement of the fulcrum or pivot point 160.

It is readily understandable that in the closed position of the mold and when the lever system 155 is extended, the forces resulting from the blowing pressure are transmitted directly to the piston rod 122b and through the lever system 155 to the associated vertical spar 123b and therethrough to the frame. The advantage of this arrangement consists in that, apart from the cylinder 121b, the hydraulic system which serves to drive the two mold halves need not absorb the considerable forces resulting from the blowing pressure which has the result that it may be designed less strongly.

In this embodiment, the only function left to the vertical spar 165b is essentially that of carrying or supporting the cylinder 121b. It should be added in order to avoid misunderstandings, that the arrangement illustrated in FIG. 4 of the drawings is applicable, of course, also to the second mold half which has not been shown.

It is, of course, understood that in the embodiment shown in FIG. 4 only one-half of the machine is shown, but in use the machine would appear as shown in FIG. 1 except for the modifications of FIG. 4 which are incorporated therein.

DESCRIPTION OF THE THIRD EMBODIMENT

Figure 5:
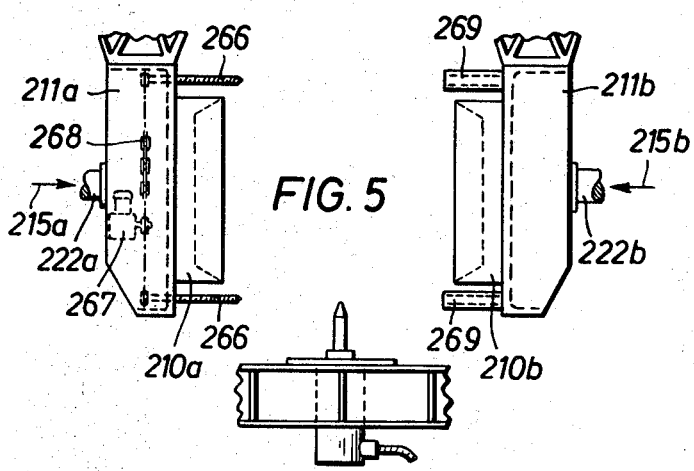
FIG. 5 illustrates a side elevational view of one half of a base of a third embodiment according to the present invention.

FIG. 5 illustrates another embodiment of this invention. Here again, there is conformity with respect to the basic construction according to the embodiment illustrated in FIGS. 1–3 so that like elements have been identified with the same reference numerals being higher, however, by 200 in each case. Here again, the two mold halves 210a and 210b are supported by bases 211a and 211b. The drive of the above-mentioned parts is effected in the manner already described by way of piston cylinder arrangements but only a portion of the piston rods 222a, 222b has been shown.

In contrast to the embodiments described above, however, one of the two bases, namely base 211a, comprises four spindles 266 which are disposed near the four corners of the base 211a and are adapted to be driven in unison by a motor 267 by way of a chain 268. The other base 211b comprises four spindle nuts 269 which are likewise arranged near the corners of the base 211b and are each positioned opposite one of the spindles 266 of the other base.

The closing of the mold which takes place by moving the two bases 211a and 211b with the mold halves 210a and 210b in the direction of the arrows 215a, 215b is effected by means of the conventional hydraulic piston cylinder arrangement, as has already been set forth hereinabove. Immediately prior to the completion of this closing movement, the spindles 266 will engage in the spindle nuts 269. The latter comprise an internal threading. By reason of the rotary movement of the spindles 266 which is brought about by the motor 267, the spindles 266 are threaded into the respective nuts 269 so that in the closing position of the mold and during the blowing process the two mold halves 210a and 210b become locked with respect to each other by means of the spindles 266 and the nuts 269. Thus, in this arrangement the forces which are produced by the blowing pressure become neither effective with respect to the hydraulic system for driving the two mold halves, nor with respect to the frame. The action of locking the two mold halves against each other has instead the result that the forces being produced by the blowing pressure are absorbed directly by the mold and are not transmitted further.

When the mold is to be opened, the spindles 266 are driven in the opposite direction. It may be said generally that, as far as the structural means do not mutually preclude each other, the possibilities described for and disclosed in the three embodiments can be applied to the other embodiments. This is true, for example, for the connection between the bases and the piston rod, shown in FIG. 3. It will also be suitable in all instances to provide for the connection between the pairs of supporting members 24c and 24d as well as the lower support elements 25c and 25d and the vertical spars 23a, 23b by means of shearing plates 70.

What is claimed is:

1. An apparatus for producing large hollow bodies from thermoplastic material including a closed unitary frame, said frame constituted by upper rail means, a base portion and spaced interconnecting first vertical spars therefor, a pair of mold elements one each of which is motivated by means carried by said vertical spars with said molds being unilaterally supported by said upper rail means, elongated extruder means extending substantially parallel to and supported by the upper rail means and communicating with an injector head extending downwardly therefrom adapted to form a parison medially therebeneath, means lying adjacent to the upper rail means and arranged for traversing the mold elements in unison to a parison encompassing position and away therefrom for removal of a blown object, and blowing nozzle means associated with the base portion for blowing said object to suitable dimensions.

2. An apparatus as claimed in claim 1, wherein the diametrically opposed first vertical spar means associating the rail means include first power means adapted to drive the mold elements.

3. An apparatus as claimed in claim 2, wherein the first power means is interconnected with a second power means situated substantially perpendicular thereto and associated with the upper rail means, said second power means being connected to the fulcrum of a lever system.

4. An apparatus as claimed in claim 2, wherein the power means and the mold elements are interconnected by complementally formed means.

5. An apparatus as claimed in claim 3, further including second vertical spar means of lesser height than said first spar means and arranged to support a portion of said lever system therefor.

6. An apparatus as claimed in claim 1, wherein means are provided for locking the mold elements together when in assembled relation.

7. An apparatus as claimed in claim 6, wherein the locking means comprise power-driven spindle means.

8. An apparatus as claimed in claim 1, wherein the means for supporting the mold elements for reciprocation comprise wheeled carriage means.

References Cited

UNITED STATES PATENTS

| | | | |
|---|---|---|---|
| 2,975,473 | 3/1961 | Hagen et al. | 18—5X |
| 3,115,673 | 12/1963 | Rudolph | 18—5X |
| 3,212,129 | 10/1965 | Craig et al. | 18—5 |
| 3,370,322 | 2/1968 | Nowicki | 18—5 |

FOREIGN PATENTS

| | | |
|---|---|---|
| 1,197,394 | 6/1959 | France. |

CHARLES W. LANHAM, Primary Examiner

M. O. SUTTON, Assistant Examiner

U.S. Cl. X.R.

18—30